(12) United States Patent
Sexton et al.

(10) Patent No.: US 6,564,223 B1
(45) Date of Patent: May 13, 2003

(54) METHOD AND ARTICLE FOR MANAGING REFERENCES TO EXTERNAL OBJECTS IN A RUNTIME ENVIRONMENT

(75) Inventors: Harlan Sexton, Menlo Park, CA (US); David Unietis, Menlo Park, CA (US); Mark Jungerman, San Francisco, CA (US)

(73) Assignee: Oracle Corp., Redwood Shores, CA (US)

( * ) Notice: Subject to any disclaimer, the term of this patent is extended or adjusted under 35 U.S.C. 154(b) by 0 days.

(21) Appl. No.: 09/408,847

(22) Filed: Sep. 30, 1999

(51) Int. Cl.[7] .............................................. G06F 17/00

(52) U.S. Cl. ................ 707/103 Y; 707/101; 707/104.1; 709/227; 709/315; 709/316; 709/330; 717/108; 717/116

(58) Field of Search .......................... 707/103 Y, 101, 707/104.1, 206; 709/315, 330, 227, 316; 717/108, 116

(56) References Cited

PUBLICATIONS

Sun Microsystems, Java Remote Method Invocation, copyright 1997–1998, <http://java.sun.com/products/jdk/1.2/docs/guide/rmi/spec/rmiTOC.doc.html>.*

Object Design Inc., Storing, Retrieving, and Updating Objects, Copyright 1997, <http://falconet.inria.fr/~java/classes/pse–1.2/doc/apiug/5_store.htm#211647>.*

* cited by examiner

*Primary Examiner*—Jean M. Corrielus
*Assistant Examiner*—Hung Pham
(74) *Attorney, Agent, or Firm*—Ditthavong & Carlson, P.C.

(57) ABSTRACT

Lazy evaluation is used for resolving references to recreatable external objects. A recreatable external object is an object whose state can easily be deallocated and later reconstituted or "activated" based on a much smaller sized descriptor. In one embodiment, a run-time external reference is used that specifies an index into a value array that holds the actual reference and a descriptor array. If the value array entry at the index is null, then the corresponding entry in the descriptor array is used to activate the external object and a reference to the activated external object is cached in the value array.

23 Claims, 5 Drawing Sheets

METHOD AND ARTICLE FOR MANAGING REFERENCES TO EXTERNAL OBJECTS IN A RUNTIME ENVIRONMENT

FIELD OF THE INVENTION

The present invention relates to computer systems and more particularly to managing references to external objects in a run-time environment.

BACKGROUND OF THE INVENTION

Computer languages that support independent constructed program units must resolve symbolic references from one program unit to an "external" object in another program unit. For example, most C and C++ programming language environments support separate compilation of source code files into object code files. When a source code file references an object defined in another source code file, the compiler typically creates an "external reference" to that object that is eventually resolved into an actual address.

A number of approaches have been developed for resolving external references. For example, with a "static linking" approach, external references are resolved at link time, i.e. when the separately compiled object code files are combined together to form a complete, executable program. Another approach is "dynamic linking," in which some object code files are grouped into modules typically called "dynamic link libraries" or "DLLs." When a program linked with DLLs is executed, the DLLs are not combined with the program until the program is loaded into memory for execution. In the dynamic linking approach, external references are resolved at load time.

One popular programming language that supports separate compilation is JAVA, a platform-independent, object-oriented language developed by Sun Microsystems. In JAVA, the attributes and methods for a class of objects are typically defined in its own source file, which is separately compiled into an architecture-neutral object file containing bytecodes that are interpreted by the target platform. Since it is common for one class to reference objects belong to another class, JAVA source files will commonly require external references to other objects and their classes.

Lately, there has been much interest in using JAVA as a development language for applications that interact with a relational database system. A relational database system stores information in tables organized into rows and columns. To retrieve the information, a database application submits queries and other "calls" to a database server process, which determines which information in the tables satisfies the request.

A multi-user database allows multiple users to connect to the database concurrently in many separate sessions, and typically only a few of the sessions are actively using the database at any particular time by making calls. When designing a run-time environment for database applications, scalability in terms of the number of simultaneous users who can establish separate sessions is very important. A significant constraint for user scalability is the size of the memory "footprint" that each session consumes, and it is desirable to reduce the session memory footprint to improve scalability.

JAVA defines the lifetime of many objects, especially system objects, to extend throughout the duration of a session. Some of these objects, however, are infrequently used. Resolving external references to such objects at link time or load time according to conventional approaches entails loading these objects when the run-time environment is executed, either because they are statically part of the executable image or are dynamically loaded from a DLL. These objects consume session memory and reduce the user scalability of the database system.

SUMMARY OF THE INVENTION

Therefore, there is a need for improving the user scalability of a relational database system implementing a run-time environment for handling database applications. A need exists for reducing the session memory footprint consumed by infrequently used objects in a run-time environment. There also exists a need for resolving external references to objects without wasting session memory.

These and other needs are addressed by the present invention, in which lazy evaluation is systematically used for resolving recreatable external references. A recreatable external reference is a reference to an object whose state can easily be deallocated and later reconstituted or "activated" based on a much smaller sized descriptor. Lazy evaluation defers loading of the external object until the object is actually used, thereby reducing memory consumption. Deallocating and recreating external objects allows for the external objects to be allocated in non-session memories, which are less detrimental on user scalability.

One aspect of the invention pertains to a computer-implemented method and a computer-readable medium bearing instructions for managing memory for an object in a run-time environment. In accordance with this aspect, an external reference is created to the object based on a stub object in a session memory. The stub object indicates a descriptor for activating the object. The external reference is dereferences by allocating and initializing the object based on the descriptor in a non-session memory, i.e. having a duration other than that of a session, such as for the duration of a call or for the duration of a database instance. In various embodiments, the object is allocated and initialized the first time the object is dereferenced during a call and deallocated after termination of the call. Thus, the bulk of the memory required to store the state of the object is allocated without consuming valuable session memory.

Another aspect involves a computer-implemented method and computer-readable medium bearing instructions for creating an external reference to an object within a run-time environment, in which the object is associated with a stub object that indicates that the object is activatable and indicates a descriptor for activating the object. Accordingly, a pointer to a stub object is accessed, an index is generated for the object based on the descriptor indicated by the stub object, and the external reference is initialized to contain the index. In one embodiment, a value array at the index position is initialized to null, and the descriptor array at the index position is initialized with the descriptor for activating the object. Preferably, the external reference is tagged so that the external reference can be intermixed in the same environment with non-external references.

Still another aspect related to a computer-implemented method and computer-readable medium bearing instructions for dereferencing an external reference. An index is extracted from the external reference. A descriptor is fetched from an entry in a descriptor array at the position indicated by the index, and the object is allocated and initialized the object based on the descriptor. In one embodiment, a value array of cached activated objects is consulted first at the position indicated by the index.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method and apparatus for memory management in a run-time environment is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
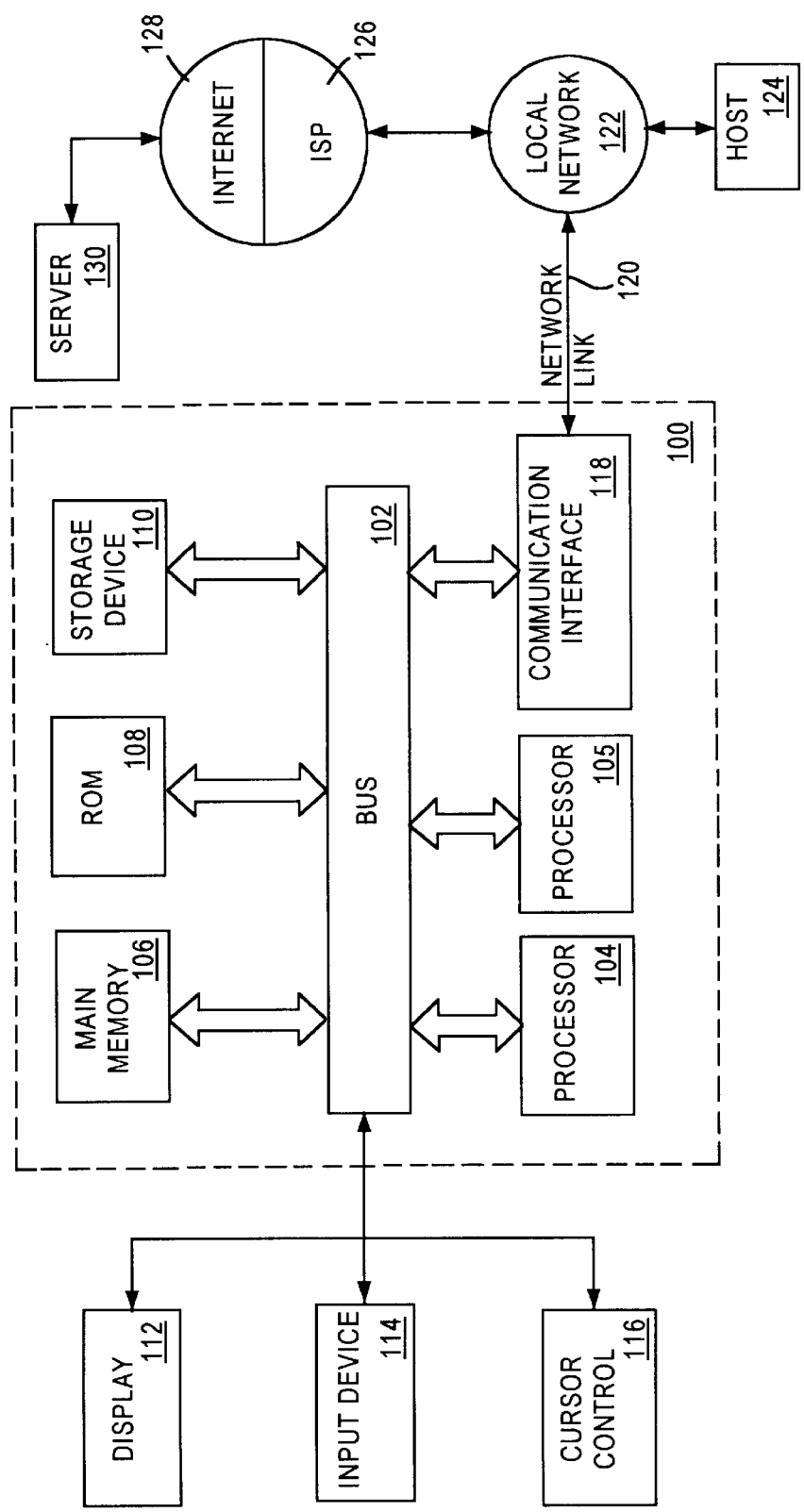
FIG. 1 depicts a computer system that can be used to implement the present invention.

FIG. 1 is a block diagram that illustrates a computer system 100 upon which an embodiment of the invention may be implemented. Computer system 100 includes a bus 102 or other communication mechanism for communicating information, and processors 104 and 105 both coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104 and processor 105. Computer system 100 further includes a read only memory (ROM) 108 or other static storage device coupled to bus 102 for storing static information and instructions for processor 104 and processor 105. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for memory management in a run-time environment. According to one embodiment of the invention, managing memory in a run-time environment is provided by computer system 100 in response to processor 104 and/or processor 105 executing one or more sequences of one or more instructions contained in main memory 106. Such instructions may be read into main memory 106 from another computer-readable medium, such as storage device 110. Execution of the sequences of instructions contained in main memory 106 causes processor 104 and/or processor 105 to perform the process steps described herein. Although FIG. 1 depicts a dual processing arrangement with processors 104 and 105, one or more processors in a uni-processing or multi-processing arrangement, respectively, may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 and/or processor 105 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described infra, or any other medium from which a computer can read.

Various forms of computer readable media may be involved in carrying one or more sequences of one or more instructions to processor 104 and/or processor 105 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 and/or processor 105 retrieves and executes the instructions. The instructions received by main memory 106 may optionally be stored on storage device 110 either before or after execution by processor 104 and/or processor 105.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for memory management in a run-time environment as described herein. The received code may be executed by processor 104 as it is received, and/or stored in storage device 110, or other non-volatile storage for later execution. In this manner, computer system 100 may obtain application code in the form of a carrier wave.

"Virtual memory" refers to memory addressable by a storage allocation technique in which auxiliary storage, such as memory in storage device 110, can be addressed as though it were part of the main memory 106. More specifically, combinations of hardware, firmware, and operating system cooperate to automatically swap portions of the code and data for an executing process on an as-needed basis. Thus, the virtual address space may be regarded as addressable main memory to a process executing on a computer system that maps virtual addresses into real addresses. The size of the virtual address space is usually limited by the size of a native machine pointer, but not by the actual number of storage elements in main memory 110.

On many operating systems, a process will utilize a certain amount of virtual memory that no other user process may access in order to provide data security. "Shared memory" refers to the virtual address space on the computer system 100 that is concurrently accessible to a plurality of executing user processes on a processor 104. In some embodiments, shared memory is also accessible to executing user processes on a plurality of processors, such as processors 104 and 105.

"Secondary storage" as used herein refers to storage elements, other than virtual memory, accessible to a process. Secondary storage may be local or networked. Local secondary storage, furnished by storage device 100 on computer system 100, is preferably a random access storage device such as a magnetic or optical disk. Networked secondary storage is provided by storage devices on other computer systems, for example on host 124, accessible over a local area network 122, or server 130, accessible over a wide area network such as the Internet.

Memory Model

Figure 2:
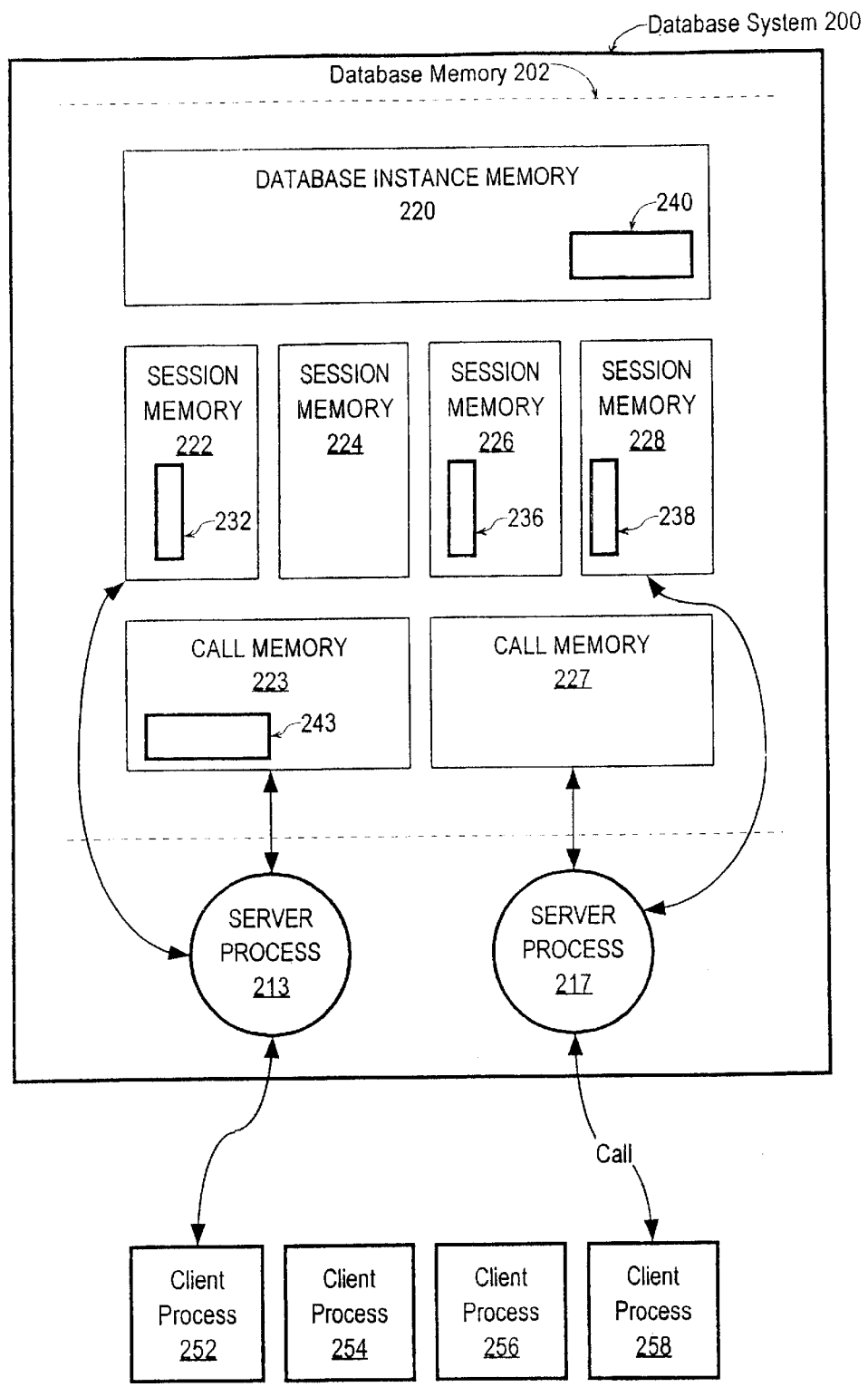
FIG. 2 is a schematic drawing of database server memory model for use with an embodiment.

FIG. 2 schematically illustrates a database system 200 with which a run-time environment for a language such as JAVA is used. In the illustrated configuration, clients processes 252, 254, 256, and 258 establish database sessions with the database system 200. A database session refers to the establishment of a connection between a client and a database system through which a series a calls may be made. As long as the client remains connected in the database session, the client and the associated database session are referred to as being active. Active clients can submit calls to the database system 200 to request the database system 200 to perform tasks. One example of a call is a query in accordance with the Structured Query Language (SQL), and another example is a method invocation of a JAVA object or class, defined for performing a database task for database system 200.

Database system 200 comprises, among other components, a database memory 202 for storing information useful for processing calls and a number of server processes 213 and 217 for handling individual calls. The database memory 202 includes various memory areas used to store data used by server processes 213 and 217. These memory areas include a database instance memory 220, session memories 222, 224, 226, and 228, and call memories 223 and 227. It is to be understood that the number of the session memories and call memories in FIG. 2 is merely illustrative and, in fact, the number of such memories will vary over time as various clients make various calls to the database system 200.

The database instance memory 220 is a shared memory area for storing data that is shared concurrently by more than one process. For example, shared memory area may be used store the read-only data and instructions (e.g. bytecodes of JAVA classes) that are executed by the server processes 213 and 217. The database instance memory 220 is typically allocated and initialized at boot time of the database system 200, before clients connect to the database system 200.

When a database session is created, an area of the database memory 202 is allocated to store information for the database session. As illustrated in FIG. 2, session memories 222, 224, 226, and 228 have been allocated for clients 252, 254, 256, and 258, respectively, for each of which a separate database session has been created. Session memories 222, 224, 226, and 228 are a shared memory used to store static data, i.e., data associated with a user that is preserved for the duration of a series of calls, especially between calls issued by a client during a single database session. JAVA class variables are one example of such static data.

A call memory, such as call memory 227, is used to store data that is bounded by the lifetime of a call. When client 258 submits a call to the database system 200, one of server processes 213 or 217 is assigned to process the call. For the duration of the call, the server process is allocated a call memory for storing data and other information for use in processing the call. For example, server process 217 uses call memory 227 and session memory 228 for processing a call submitted by client process 258.

At any given time, a server process is assigned to process a call submitted by a single client. After the server process completes its processing of a call from one client, the server process is free to be assigned to respond to the call of another client. Thus, over a period of time, a server process may be assigned to process calls from multiple clients, and a client may use multiple server processes to handles its various calls. The number of calls requiring execution by a server process is typically much fewer than the current number of active clients. Thus, database system 200 is typically configured to execute fewer server processes than the maximum number of active clients.

External Objects

Since session memory is allocated for each active client session, user scalability is improved by reducing the memory requirements of session memory. In accordance with one aspect, memory requirements for session memory are reduced by deferring the allocation of external objects in session memory until those external objects are actually accessed. This is referred to as lazy evaluation for resolving external objects. In particular, these external objects (whose allocation in session memory is designated to be deferred until they are accessed) are so designated by creating external references to them, for example by implementers of the run-time environment.

One example of an external object whose allocation would be desirable to defer is a class definition for a required, but rarely used system class, such as a system error class. This class typically requires much memory to be allocated for static member variables, for example, for error messages that are output as well as for the byte codes of the error handling instructions. Therefore, allocating a system error class in session memory increases the session memory footprint and thereby reduces the number of users who can establish a session at one time, even though that allocated session memory is rarely used. Accordingly, the allocation of the class definition for such a class is deferred until the class is actually used. Furthermore, even when the class definition is allocated upon access, the class definition can be allocated in non-session memory.

Figure 3:
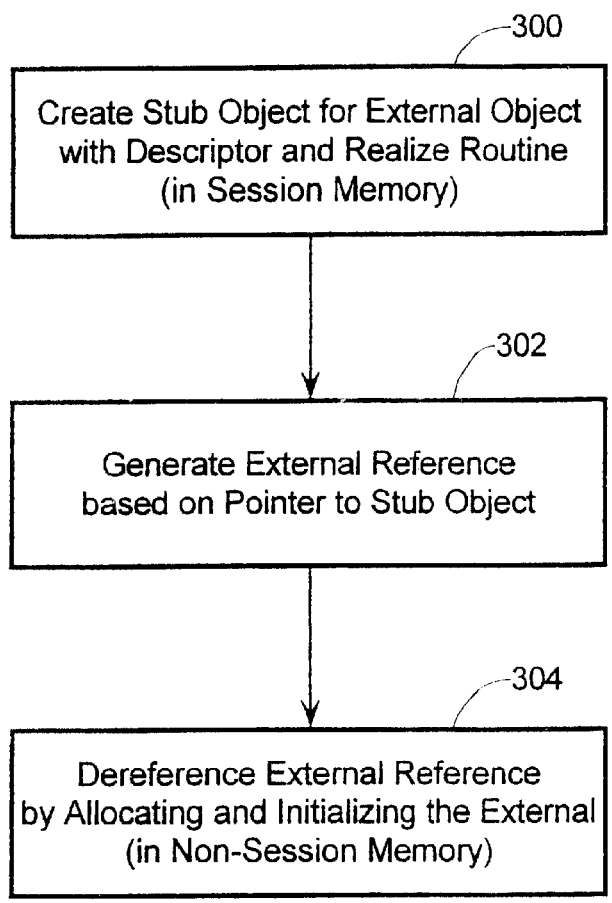
FIG. 3 is a flowchart for resolving recreatable external references according to an embodiment.

FIG. 3 depicts a flowchart illustrating the memory management involving the lazy evaluation of external references. At step 300, a stub object for the external object is created in session memory. The stub object includes a "descriptor," which is a group of data that identifies the external object and is sufficient to create or recreate the external object. Typically, the descriptor is a string that names to the object or includes directions for loading and initializing the external object, for example, from an identified file in secondary storage. Furthermore, the stub object is associated with a "realize routine," which can be a static member function or a generic function for the stub object's class. The realize routine is responsible for creating or recreating the external object using the information encoded in the descriptor. The implementation of the realize routine and descriptor is dependent on the particular external object and generally is written specifically for that external object or for external objects belonging to a particular class.

In one embodiment, the stub object is marked "activatable", for example by setting an appropriate bit in the object header, to distinguish the stub object from other objects whose loading into session memory is not to be deferred. Thus, an activatable, stub object is a proxy for another object that will be recreated upon demand using information stored in the activatable, stub object.

Run-time External References

At step 302 in FIG. 3, when a pointer to the stub object is assigned to a slot in an object, for example during initialization of the object, a run-time external reference is generated based on the pointer to the stub object and stored in the slot instead of the pointer to the stub object. A run-time external reference is a reference to an external object, such that dereferencing the run-time external reference causes the external object to be loaded into virtual memory, if the external object is not currently loaded.

Figure 4:
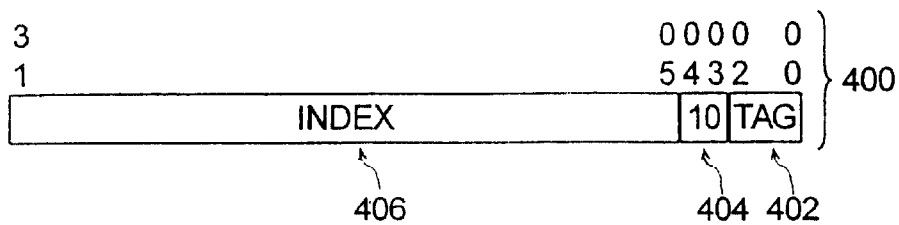
FIG. 4 is a schematic drawing of a layout of an external reference in accordance with an embodiment

FIG. 4 illustrates the layout of a run-time external reference 400 according to one embodiment. In order for run-time external references to coexist with other types of references, such as machine pointers and numeric references to loaded objects, a run-time external reference preferably includes a tag 402 that indicates that the reference is a runtime external reference. In this embodiment, non-external references are also tagged, but with a different value to distinguish themselves from run-time external references and to indicate other storage properties of the objects they reference. In other embodiments that do not employ reference tagging, this information can be stored in the header or body of the object, for example by deriving all external objects from a base class for activatable objects.

In one implementation of reference tagging, a certain number of bits in a reference, for example the higher-order bits or lower-order bits, is reserved for distinguishing the run-time external references from other references. The information embedded within the reference, which is likely to be sitting in a fast-access machine register, can therefore be retrieved very quickly, without requiring additional memory cycles to fetch the header of the referenced object.

A preferred implementation of reference tagging introduces an alignment invariant and then exploits the alignment invariant in a run-time environment to encode the run-time external reference format in the lower-order bits. Specifically, objects managed by the run-time environment are stored at an N-bit aligned address, or, in other words, the storage for these objects begins at virtual addresses at $2^N$-byte boundaries. For example, if the objects can be stored at three-bit aligned addresses, that is, on $2^3=8$ byte boundaries, a legal start address for such an object might be 0x20446740, but an address such as 0x20446743 is not a valid start address for the storage of an object.

Consequently, the three least significant bits of the reference do not serve to differentiate different objects, since only one of the eight values for the three least significant bits is a legal address and the remaining seven values do not point to any other object. Given this alignment restriction, references that resolve to addresses 0x20446740 through 0x20446747 effectively refer to the same object. Therefore, any of the N least significant bits of a reference to an N-bit aligned object can be used as a tag to encode other information, for example, whether the referenced object may be an external object to be loaded upon use.

A three-bit tag in a thirty-bit reference, will theoretically allow for $2^{32-3}=2^{29}$, or about half a billion, different run-time external references. Since this number of run-time external references is well in excess of what is needed in most, if not all, run-time environments and since the number of different three-bit tag values is limited (i.e. to eight), the same three-bit tag value for run-time external references is preferably shared with other kinds of external reference. In one embodiment, the tag value used by runtime external references is shared with indexed references, an indexed reference is a type of reference that evaluates to an array entry of one sort or another.

Accordingly, some the non-tag bits of an indexed reference specify the array and other bits specify an index into the array. In the case of a run-time external reference 400 in FIG. 4, array bits 404 specifies the arrays that are used to implement run-time external references, namely a descriptor array and a value array. The remaining, index bits 406 specify the common index into the descriptor array and the value array. In one embodiment, the descriptor array is allocated in session memory, e.g. as descriptor arrays 232, 236, and 238 in sessions memories 222, 226, and 228, respectively, while the value array can be allocated in non-session memory, for example, value array 243 in call memory 223 or value array 240 in database instance memory 220.

Creating Run-time External References

Figure 5:
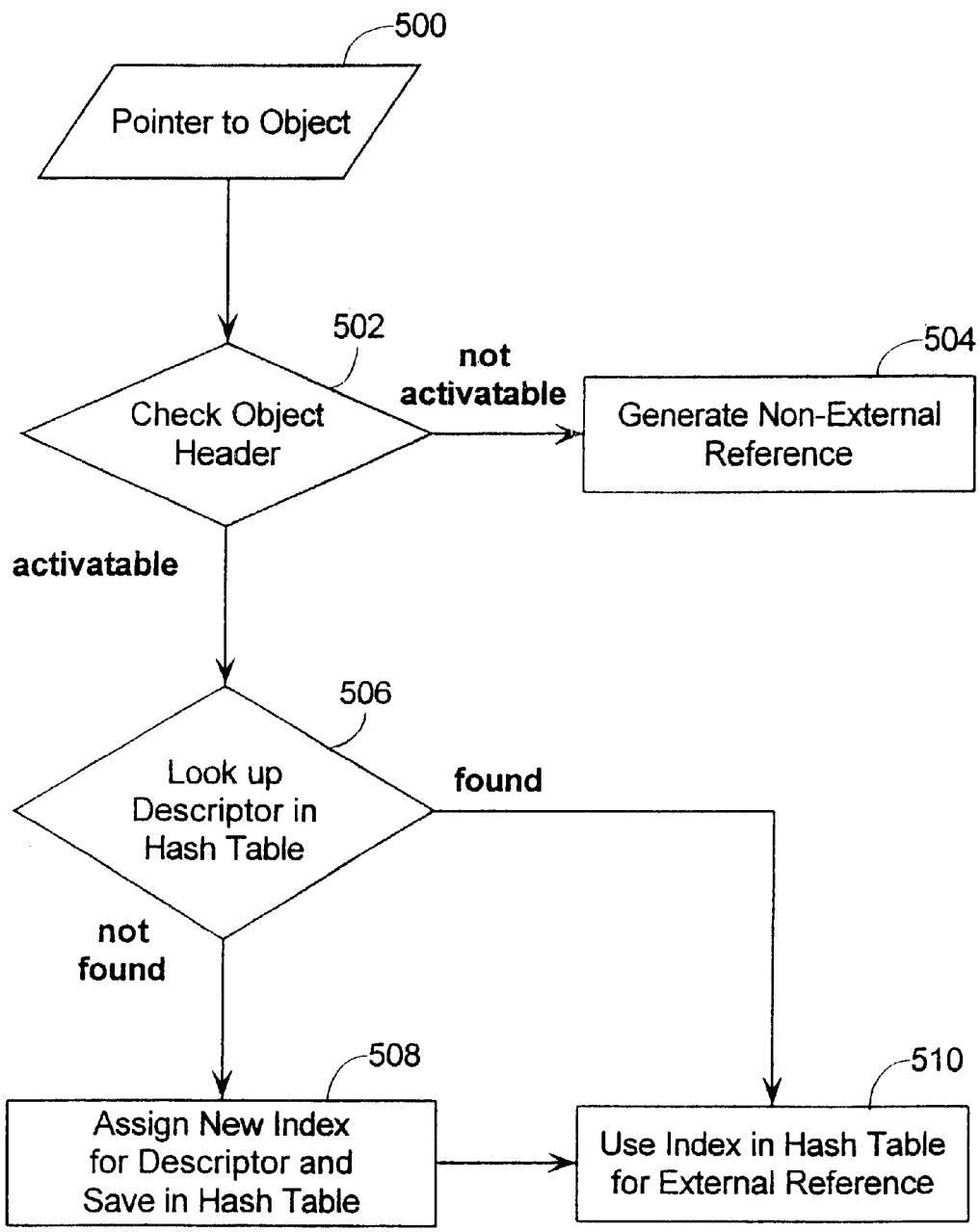
FIG. 5 is a flowchart for generating an external reference from a pointer to a stub object in an embodiment.

FIG. 5 is a flowchart illustrating steps taken in creating a run-time external reference for an external object based on a pointer to a stub object for the external object in accordance with an embodiment. At a step 500, a pointer to stub object is obtained for assignment in a slot of an object within the run-time environment. Typically, this pointer value is obtained a variable passed into a function, returned from a function or memory allocation operator, loaded from a memory address not part of the program state, or produced by dereferencing a reference to the stub object.

During the assignment procedure in step 502, the pointer is dereferenced at a zero or negative offset to check a bit in the header of the object for determining whether the dereferenced object is "activatable." An activatable object is an object that can be allocated and initialized upon dereference. If the object is not activatable, then the non-external reference is generated as appropriate for the run-time environment (step 504). For example, if the run-time environment uses tagged machine pointers to reference objects, then an appropriate tagged machine pointer is generated. As another example, if the run-time environment uses tagged numeric references to reference objects in session memory, then an appropriate numeric reference is generated. This reference is stored in the slot of the object.

If, on the other hand, the object is activatable, the referenced object is a stub object and therefore contains a descriptor for activating the object or, in some embodiment, a pointer to the descriptor. Since multiple external references may be generated for the same external object, the descriptor, which uniquely identifies the external object, is looked up in a data structure, such as a hash table to determine whether the external object was already referenced (step 506). If the descriptor is not found in the hash table, then a new index is assigned for the descriptor (and therefore for the external object) and stored in the hash table (step 508). On the other hand, if the descriptor is found in the hash table, the previously assigned index for the descriptor (and therefore the external object) is obtained from the hash table. At step 510, the obtain index value, whether newly assigned or fetched from the hash table, is stored in the in the index portion 406 of the run-time external reference 400.

After the run-time external reference has been generated during an assignment operation, the run-time external reference is stored in the slot of an object, just like any other reference in the run-time environment is stored in the slot.

Creating and Recreating External Objects

Referring again to FIG. 3, a run-time external reference is dormant until the run-time external reference is dereferenced during operation of the run-time environment. Dereferencing a run-time external reference refers to resolving the reference into a machine pointer and accessing the memory at an address indicated by the machine pointer. When the run-time external reference is dereferenced during operation of the run-time environment, the memory for the external object referenced by the run-time external reference is allocated and initialized, preferably in non-session memory (step 304).

Figure 6:
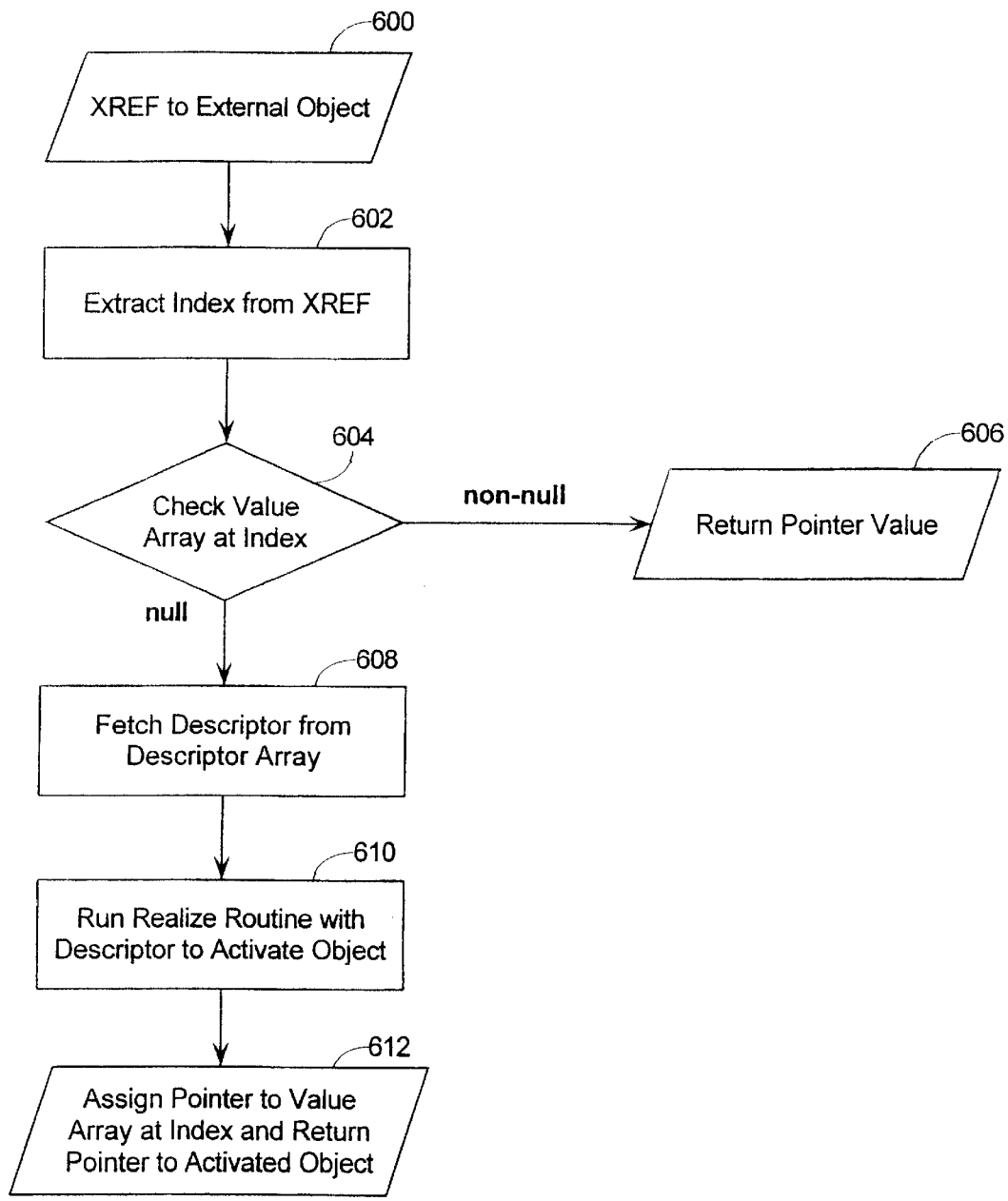
FIG. 6 is flowchart for dereference an external reference in an embodiment.

FIG. 6 is a flowchart illustrating steps taken in resolving a run-time external reference into a machine pointer to a loaded, external reference. At step 600, a run-time external reference is obtained, typically by reading the run-time external reference from a slot in an object at a given memory address. Assuming the tag value of the reference indicates that the reference is indeed a run-time external reference, the index portion 406 of the run-time external reference 400 is extracted (step 602).

At step 604, the value array, e.g. value array 243 for client process 252, is checked at the extracted index. The value array 243 stores references to previously loaded external objects. If an external object is not loaded, then the corresponding reference in the value array 243 is null. Therefore, if the reference in the value array 243 is not-null, then the external object referenced by the run-time external reference is currently loaded. Thus the reference in the value array 243 is resolved into a machine pointer value and returned (step 606).

If, on the other hand, a null reference was found in the value array 243, then the external object needs to be activated. Accordingly, the descriptor for the external object is fetched from the same index in the parallel descriptor array 232 (step 608). The descriptor array 232 entry for this index was previously set when the run-time external reference was originally assigned. The realize routine, associated with the stub object, such as a member function or a generic function, is executed, using the fetched descriptor value (step 610).

Running the realize routine causes memory for the object to be allocated and initialized. The implementation of the realize routine will vary from object to object, but the present invention is not limited to any particular implementation of the realize routine. For example, the realize routine may activate the external object by loading data in a file from secondary storage into a data structure for the array or by pointing to a shared object 230 in database instance memory 220 that was identified by hashing the descriptor. After the realize routine is run, the pointer to the activated object is cached in the value array at the index and returned (step 612).

Since loading of an external object referenced by a run-time external object is deferred until the run-time external reference is dereferenced, it is not necessary to allocate memory, e.g. session memory, until the external object is actually used, thereby reducing the session memory footprint and increasing scalability. Even when the external object is finally loaded, the bulk of the external object is allocated and recreated as-needed in a non-session memory, such as call memory or database instance memory, which is another way of reducing the session memory footprint and increasing scalability. Thus, use of run-time external references implements a systematic, lazy evaluation for external references.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method of managing memory for an object in a run-time environment, comprising the computer-implemented steps of:

creating an external reference to the object based on a stub object in a first memory having a duration of a session, said stub object indicating a descriptor for activating the object; and dereferencing the external reference by allocating and initializing the object based on the descriptor in a second memory having a duration other than a session duration, wherein the duration of the session is bounded by a period in which a client has established a connection to a database system.

2. The method of claim 1, wherein the second memory has a duration of a call.

3. The method of claim 1, wherein the second memory has a duration of a database instance.

4. The method of claim 1, wherein said session includes an establishment of a connection between a client and a database system.

5. The method of claim 2, wherein said call includes a request from a client to a database system to perform a database operation.

6. The method of claim 3, wherein said duration of a database instance includes a period of time in which a database system is running.

7. A computer-readable medium bearing instructions for managing memory, said instructions being arranged, upon execution thereof, to cause one or more processes to perform the steps of the method of claim 1.

8. A method of managing memory for an object in a run-time environment, comprising the computer-implemented steps of:

creating an external reference to the object based on a stub object in a first memory having a duration of a session, said stub object indicating a descriptor for activating the object; and when dereferencing the external reference the first time during a call, allocating and initializing the object in a second memory having a duration of the call, wherein the duration of the session is bounded by a period in which a client has established a connection to a database system.

9. The method of claim 8, further comprising the step of deallocating the object after termination of the call.

10. A computer-readable medium bearing instructions for managing memory, said instructions being arranged, upon execution thereof, to cause one or more processes to perform the steps of the method of claim 8.

11. A method of creating an external reference to an object within a run-time environment, comprising the computer-implemented steps of:

accessing a pointer to a stub object, said stub object in a memory having a duration of a session and indicating (a) that the object is activatable and (b) a descriptor for activating the object; and if the stub object indicates that the object is activatable, then performing the steps of:

generating an index based on the descriptor; and initializing the external reference to contain the index, wherein the duration of the session is bounded by a period in which a client has established a connection to a database system.

12. The method of claim 11, wherein the step of generating the index based on the descriptor includes the steps of:

consulting a data structure to determining if an index had been assigned to the descriptor;

if an index had been assigned to the descriptor, then returning the assigned index; and if an index had not been assigned to the descriptor, then assigning a new index for the descriptor and returning the new index.

13. The method of claim 12, wherein the data structure is a hash table.

14. The method of claim 11, wherein the external reference has a tag and the step of initializing the external reference includes setting the tag to indicate that the reference is an activatable external reference.

15. The method of claim 11, further comprising the step of, if the stub object indicates that the object is activatable, then performing the steps of:

initializing an entry in a value array at a position indicated by the index with a null value; and initializing an entry in a descriptor array at a position indicated by the index with the descriptor.

16. A computer-readable medium bearing instructions for managing memory, said instructions being arranged, upon execution thereof to cause one or more processes to perform the steps of the method of claim 11.

17. A method of dereferencing an external reference, comprising the computer-implemented steps of:

extracting an index from the external reference;

fetching a descriptor from an entry in a descriptor array in a memory having a duration of a session at a position indicated by the index;

allocating and initializing the object based on the descriptor; and dereferencing using a pointer to the allocated and initialized object, wherein the session duration is bounded by a period in which a client has established a connection to a database system.

18. A computer-readable medium bearing instructions for managing memory, said instructions being arranged, upon execution thereof, to cause one or more processes to perform the steps of the method of claim 17.

19. A method of dereferencing an external reference, comprising the computer-implemented steps of:

extracting an index from the external reference;

fetching a pointer value from an entry in a value array in a memory having a duration of a session at a position indicated by the index;

if the pointer value is not a null value, then dereferencing using the pointer value; and if the pointer value is a null value, then performing the steps of:

fetching a descriptor from an entry in a descriptor array at a position indicated by the index;

allocating and initializing the object based on the descriptor; and dereferencing using a pointer to the allocated and initialized object, wherein the duration of the session is bounded by a period in which a client has established a connection to a database system.

20. A computer-readable medium bearing instructions for managing memory, said instructions being arranged, upon execution thereof, to cause one or more processes to perform the steps of the method of claim 19.

21. A method of managing memory for an object in a run-time environment, comprising the computer-implemented steps of:
- creating a stub object in a session memory, said stub object indicating a descriptor for activating the object;
- creating an external reference to the object by: accessing a pointer to the stub object, generating an index based on the descriptor, and initializing the external reference to contain the index; and
- dereferencing the external reference the first time in a call by: extracting the index from the external reference, allocating and initializing the object in a call memory, and generating a pointer to the allocated and initialized object, wherein a duration of the session memory is bounded by a period in which a client has established a connection to a database system.

22. The method of claim 21, further comprising the steps of:
- deallocating the allocated and initialized object after termination of the call; and
- reallocating and reinitializing the object when dereferencing the external reference in a subsequent call.

23. A computer-readable medium bearing instructions for managing memory, said instructions being arranged, upon execution thereof, to cause one or more processes to perform the steps of the method of claim 21.

* * * * *